US012581525B2

(12) United States Patent
Montero Bayo et al.

(10) Patent No.: US 12,581,525 B2
(45) Date of Patent: Mar. 17, 2026

(54) METHODS FOR COMMUNICATION DEVICES FOR OR ADJUSTING A PROCESSING GAIN, APPARATUS, VEHICLE AND COMPUTER PROGRAM

(71) Applicant: VOLKSWAGEN AKTIENGESELLSCHAFT, Wolfsburg (DE)

(72) Inventors: Luca Montero Bayo, Barcelona (ES); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 505 days.

(21) Appl. No.: 17/937,886

(22) Filed: Oct. 4, 2022

(65) Prior Publication Data

US 2023/0115781 A1      Apr. 13, 2023

(30) Foreign Application Priority Data

Oct. 7, 2021    (EP) ..................................... 21201422

(51) Int. Cl.
| | |
|---|---|
| *H04W 72/543* | (2023.01) |
| *H04W 72/0453* | (2023.01) |
| *H04W 72/51* | (2023.01) |
| *H04W 72/53* | (2023.01) |

(52) U.S. Cl.
CPC ..... *H04W 72/543* (2023.01); *H04W 72/0453* (2013.01); *H04W 72/51* (2023.01); *H04W 72/53* (2023.01)

(58) Field of Classification Search
CPC ........... H04W 72/543; H04W 72/0453; H04W 72/51; H04W 72/53; H04W 4/40; H04W 76/40; H04B 7/0617
See application file for complete search history.

(56) References Cited

U.S. PATENT DOCUMENTS

| | | | |
|---|---|---|---|
| 10,530,451 B1 | 1/2020 | Bansal et al. | |
| 11,558,088 B1 * | 1/2023 | Gutman | ................... H04L 5/14 |
| 2019/0230485 A1 * | 7/2019 | Hahn | .................... H04W 80/02 |
| 2019/0319840 A1 | 10/2019 | Cheng et al. | |

(Continued)

FOREIGN PATENT DOCUMENTS

| | | |
|---|---|---|
| CN | 111757299 A | 10/2020 |
| CN | 112544121 A | 3/2021 |

(Continued)

OTHER PUBLICATIONS

European Search Report; European Patent Application No. 21201422. 9; Apr. 19, 2022.

(Continued)

*Primary Examiner* — Yu-Wen Chang

(74) *Attorney, Agent, or Firm* — BARNES & THORNBURG LLP

(57)          ABSTRACT

A method for a communication device to adjust a processing gain of a radio communication with another communication device including transmitting a request for processing gain information to the other communication device, which allows the communication device to achieve a processing gain necessary for a service of the radio communication and receiving a processing gain response message including the processing gain information from the other communication device.

21 Claims, 2 Drawing Sheets

100

110
transmitting a request for processing gain information to the other communication device, which allows the communication device to achieve a processing gain necessary for a service of the radio communication 120
receiving a processing gain response message comprising the processing gain information from the other communication device

(56)  References Cited

U.S. PATENT DOCUMENTS

| | | | | |
|---|---|---|---|---|
| 2021/0258853 A1* | 8/2021 | Wang | .................... | H04W 36/22 |
| 2021/0410162 A1* | 12/2021 | Kang | ................ | H04W 72/1263 |
| 2022/0039082 A1* | 2/2022 | Belleschi | ................ | H04W 4/40 |
| 2022/0046730 A1* | 2/2022 | Peng | .................. | H04W 72/044 |
| 2022/0086685 A1 | 3/2022 | Kang et al. | | |
| 2022/0345192 A1* | 10/2022 | Raghavan | .............. | H04B 17/27 |
| 2023/0213933 A1* | 7/2023 | El Essaili | .............. | G05D 1/227 |
| | | | | 701/2 |

FOREIGN PATENT DOCUMENTS

| | | | |
|---|---|---|---|
| CN | 112997536 A | 6/2021 | |
| EP | 3742767 A1 | 11/2020 | |
| WO | 2020076071 A1 | 4/2020 | |
| WO | 2020226658 A1 | 11/2020 | |
| WO | 2021/023380 A1 | 2/2021 | |

OTHER PUBLICATIONS

Extended European Search Report; European Patent Application No. 21201422.9; Jul. 20, 2022.

Toyota InfoTechnology Center, "Discussion on beam management for NR-V2X sidelink in millimeter-wave bands." In 3G PP TSG RAN WG1 Meeting, Aug. 2018, pp. R1-1809039, vol. 94, Gothenburg, Sweden.

Office Action; European Patent Application No. 21 201 422.9; May 27, 2025.

Office Action; Chinese Patent Application No. 202211219136.2; Sep. 27, 2025.

* cited by examiner

Fig. 1

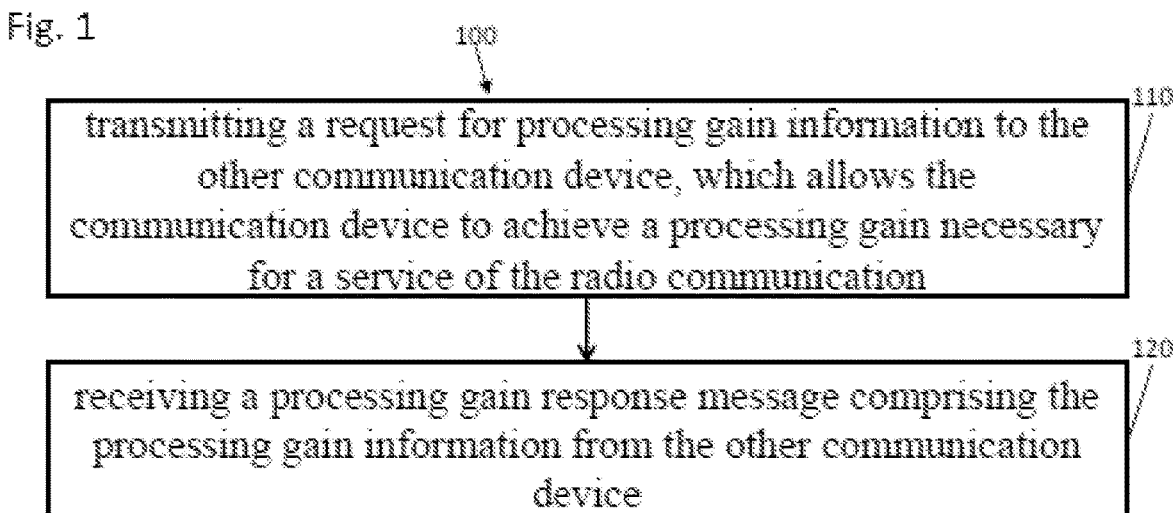

100 transmitting a request for processing gain information to the other communication device, which allows the communication device to achieve a processing gain necessary for a service of the radio communication    110 receiving a processing gain response message comprising the processing gain information from the other communication device    120

Fig. 2

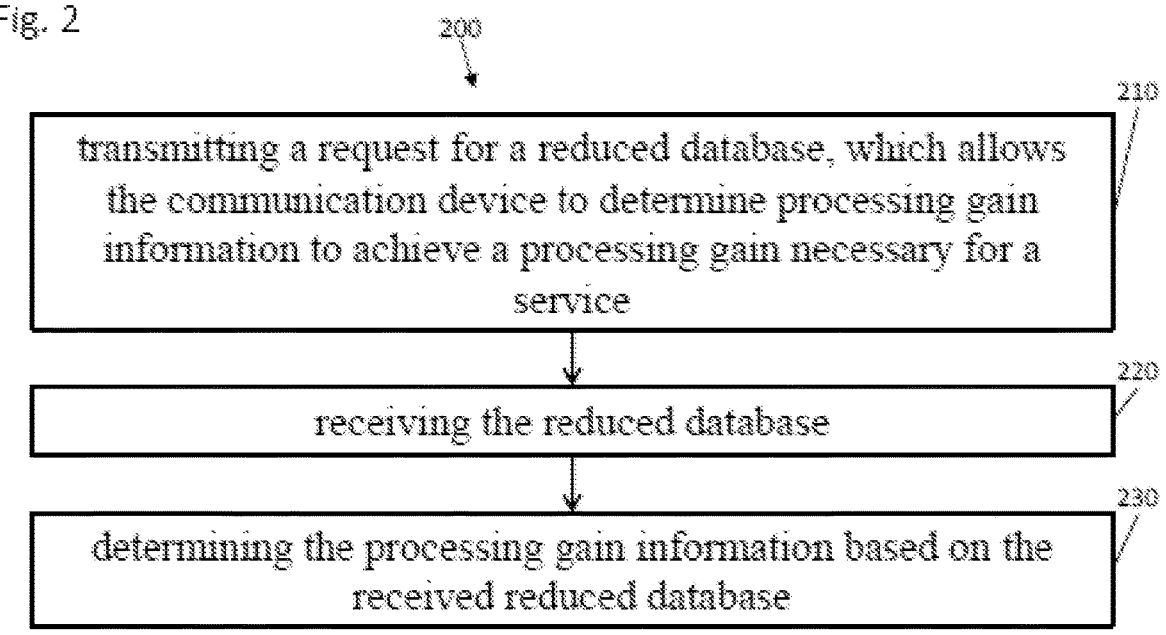

200 transmitting a request for a reduced database, which allows the communication device to determine processing gain information to achieve a processing gain necessary for a service    210 receiving the reduced database    220 determining the processing gain information based on the received reduced database    230

Fig. 3

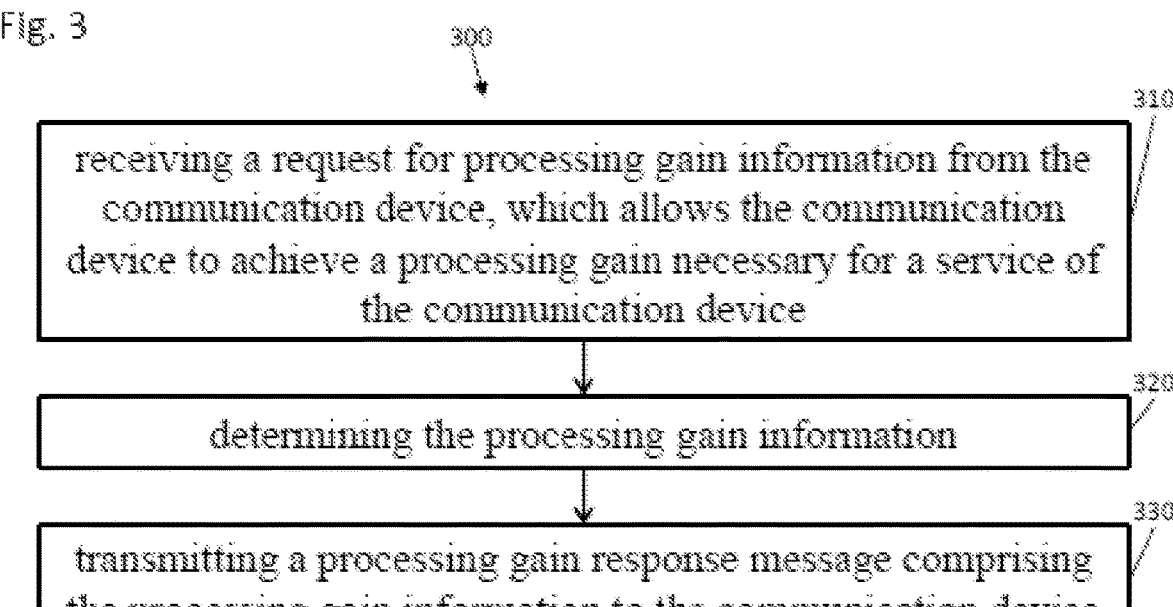

300 receiving a request for processing gain information from the communication device, which allows the communication device to achieve a processing gain necessary for a service of the communication device — 310 determining the processing gain information — 320 transmitting a processing gain response message comprising the processing gain information to the communication device — 330

Fig. 4

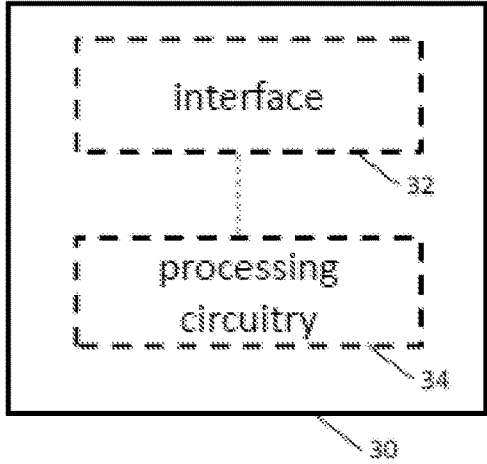

interface — 32 processing circuitry — 34

30

METHODS FOR COMMUNICATION DEVICES FOR OR ADJUSTING A PROCESSING GAIN, APPARATUS, VEHICLE AND COMPUTER PROGRAM

PRIORITY CLAIM

This patent application claims priority to European Patent Application No. 21201422.9, filed 7 Oct. 2021, the disclosure of which is incorporated herein by reference in its entirety.

SUMMARY

Illustrative embodiments relate to the field of wireless communication. Illustrative embodiments further relate to methods for communication devices for or adjusting a processing gain, an apparatus, a transportation vehicle and a computer program, more particularly, but not exclusively, to a concept for providing information about a system configuration to achieve a desired processing gain, e.g., to adjust a transmission channel parameter of a radio channel for using a desired application.

BRIEF DESCRIPTION OF THE DRAWINGS

Disclosed embodiments of apparatuses and/or methods will be described in the following by way of example only, and with reference to the accompanying figures, in which:

FIG. 1 shows an example of a method for a communication device;

FIG. 2 shows another example of a method for a communication device;

FIG. 3 shows an example of a method for another communication device; and

FIG. 4 shows a block diagram of an apparatus.

DETAILED DESCRIPTION

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing transportation vehicles to make use of the same spectrum options, even for Vehicle-to-Vehicle (V2V) use cases.

Providing the NR support of V2X, transportation vehicles are also capable of communicating at frequencies above 6 GHz. In 5G, these higher frequency bands are allocated at the mmWave range of the spectrum (30-300 GHz). The use of higher frequency bands in communications implies propagating in a harsher channel, where the free-space path loss scales with ($f^2$), and shading by obstacles and atmospheric effects (i.e., water vapor and oxygen absorption, or rain) take a non-negligible role. Services relying on higher frequency systems, with their inherently high channel-induced attenuation, might find challenging to deliver satisfactory QoS in some situations where signal power attenuation is increased, lowering the received Signal-to-Noise Ratio. As a result, 5G User Equipment (UE) is reliant on multi-antenna front ends to perform beamforming and focus the radiate power towards the intended transmitter/receiver. It is thus worth considering that transportation vehicles may be equipped with an advanced multi-antenna system.

On the other side, the automotive industry has recently concentrated its efforts towards ensuring that the services for connected and automated mobility can offer satisfactory QoS along the journey. This is deemed important both for frictionless traveling and safety-critical use cases that depend on communications performance to deliver the required service. As a result, Predictive QoS (PQoS) has emerged as one of the most relevant features in both sidelink and network-based vehicular communications, as ensuring the availability of the service in the upcoming driving seconds/kilometers might be critical for highly automated/connected applications where the driver is not in full control of the transportation vehicle's response.

U.S. Pat. No. 10,530,451 B1 shows embodiments for modifying a vehicle-to-everything (V2X) radio of a first endpoint based on beam alignment feedback data. In some embodiments, a method for the first endpoint includes detecting an intention of the first endpoint to exchange a first millimeter wave (mm Wave) message with a second endpoint. The method includes determining scenario data describing a scenario of one or more of the first endpoint and the second endpoint. The method includes requesting a recommended beam alignment setting from a connected computing device based on the scenario data. The method includes receiving feedback data describing the recommended beam alignment setting from the connected computing device. The method includes modifying an operation of the V2X radio of the first endpoint based on the recommended beam alignment setting.

US 2019/0 319 840 A1 shows a method for wireless communication by a user equipment (UE). The method generally includes determining one or more parameters corresponding to QoS information for communication of data using a V2X communication protocol. Further, the method comprises reporting the one or more parameters by transmitting a first message and receiving a second message indicating configuration information corresponding to the communication of the data using the V2X communication protocol. Further, the method comprises communicating data based on the configuration information.

EP 3 742 767 A1 shows a method for predicting a QoS, hereinafter for a communication over a communication link (Uu), where at least one communication partner is moving. This might be a transportation vehicle moving on a road. The method comprises an operation of data gathering in which a plurality of momentary link characteristics will be measured and recorded in a database along with the position and time information for the moving communication partner. Further, the method comprises an operation of data modelling in which the statistical distribution of a given target QoS is modelled and an operation of predicting a target QoS.

The use of highly directive antenna systems (required to operate at high frequency bands such as mmWave) for vehicular communications adds several configuration dimensions to the link between the transportation vehicle and the network/infrastructure or between two transportation vehicles, as both nodes require establishing the most suitable beam configuration (e.g., beamwidth, beam-switching rate, gain) to maximize link performance.

However, so far both nodes need to update periodically the beam configuration to effectively track the transmitter/ receiver—a task that intensifies in high mobility scenarios—in a process that often requires exchanging beamformed pilot signals to find the most suitable one. This process, in fast-changing and/or congested scenarios might be suboptimal and the connection, and thus the expected QoS, will not always be satisfactory as beam misalignment might disable or severely jeopardize the performance of a service.

It is therefore a finding that a processing gain can be adjusted by requesting processing gain information, which allows a communication device to achieve a processing gain necessary for, e.g., a desired service. Inefficient periodically updates can then be reduced or even omitted. For example, a beam configuration (e.g., for highly directive antenna) can be determined and a predictive QoS (PQoS) performance can be estimated, such that a desired service can be used. That way, a determination of a beam configuration can be improved. For example, a QoS prediction known from the art based on the collection of general data such as V2X application or network performance and then generating an estimation of the network conditions at a given location/time can be improved by the use of PQoS.

Examples provide a method for a communication device for adjusting a processing gain of a radio communication with another communication device. The method comprises transmitting a request for processing gain information to the other communication device, which allows the communication device to achieve a processing gain necessary for a service of the radio communication. Further, the method comprises receiving a processing gain response message comprising the processing gain information from the other communication device. Thus, the communication device can receive required information for adjusting a processing gain, e.g., for a desired service, in an improved way. For example, a PQoS can be comprised by the processing gain information, such that the communication device may select a service based on the PQoS.

In an example, the processing gain information may comprise information about at least one element of the group of: a radio channel parameter, a number of antennas used for communication, an antenna configuration, a usage time of the processing gain information, a predictive quality of signal and a radio access technology. Thus, the communication device can be informed about an appropriate system configuration for communication purposes corresponding to a desired service in an improved way.

In an example, the request may further comprise performance information about at least one element of the group of a desired service type, a desired service priority, a desired route of the communication device and a desired velocity of the communication device. Thus, the processing gain information can be determined by the other communication device based on desired use case, which may improve a usability of the processing gain information. For example, the processing gain information may only be transmitted if a desired use of a service can be provided by the other communication device.

In an example, the processing gain response message may further comprise data about a confidence level of the processing gain information and/or a movement parameter of the communication device necessary for the service. Thus, the communication device can be informed in an eased way about a reliability of the information, e.g., for a safety critical service and/or about a movement parameter required for a service.

In an example, the method may further comprise using the processing gain information, data about the confidence level and/or a movement parameter of the communication device necessary for the service to adjust a parameter of an antenna system of the communication device. Thus, the antenna system of the communication device can be configured in an eased way.

In an example, the request for the processing gain information and/or the processing gain response message may be transmitted by a broadcast message, groupcast message or unicast message. Thus, the processing gain information can be transmitted in a desired way, e.g., using a broadcast message to obtain processing gain information from a plurality of other communication devices.

Examples relates to a method for a communication device for adjusting a processing gain. The method comprises transmitting a request for a reduced database, which allows the communication device to determine processing gain information to achieve a processing gain necessary for a service. Further, the method comprises receiving the reduced database and determining the processing gain information based on the received reduced database. Thus, the communication device can be enabled to determine the processing gain information on its own, which e.g., may decrease data traffic for a plurality of processing gain information determination.

Examples relate to a method for another communication device for adjusting a processing gain of a radio communication with a communication device. The method comprises receiving a request for processing gain information from the communication device, which allows the communication device to achieve a processing gain necessary for a service of the communication device. Further, the method comprises determining the processing gain information and transmitting a processing gain response message comprising the processing gain information to the communication device. Thus, the communication device can be enabled to adjust a processing gain, e.g., for a desired service, in an improved way.

In an example, the request may comprise performance information about at least one element of the group of a desired service type, a desired service priority, a desired route of the communication device and a desired velocity of the communication device and determining the processing gain information is further based on the performance information. Thus, the processing gain information can be determined by the other communication device based on a desired use case, which may improve a usability of the processing gain information.

In an example, the processing gain information may be determined by use of a database, comprising information about at least one element of the group of a service type, a service priority, a route of the communication device, a network load, a service QoS requirement, a weather, a coverage map, a road topology and a quality-of-service performance record. Thus, a determination of the processing can be eased and/or improved by using e.g., static data such like a road topology and/or dynamic data such like a network load.

In an example, the method may further comprise editing the database with the determined processing gain information and/or with corresponding performance information received from the communication device. Thus, the other communication can maintain the database and a determination of the processing gain information can be improved for a future request.

In an example, the method may further comprise receiving a request for a reduced database from the communication device and transmitting at least a part of the database to the communication device. Thus, the communication device can be enabled to determine the processing gain information on its own, which e.g., may decrease data traffic for a plurality of processing gain information determination.

Examples further provide an apparatus, comprising one or more interfaces configured to communicate with a communication device or user equipment. The apparatus further comprises processing circuitry configured to control the one or more interfaces and to perform the method for user equipment and/or a communication device described above.

Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

FIG. 1 shows an example of a method 100 for a communication device. The method 100 for the communication device is for adjusting a processing gain of a radio communication with another communication device. The method 100 comprises transmitting 110 a request for processing gain information to the other communication device, which allows the communication device to achieve a processing gain necessary for a service of the radio communication. Further, the method 100 comprises receiving 120 a processing gain response message comprising the processing gain information from the other communication device. Thus, required information to establish a communication channel to use a desired service can be transmitted to the communication device on request. This may improve the radio communication between the communication device and the other communication device, e.g., be allowing the use of a desired service.

The communication device may communicate in a mobile communication system with the other communication device, e.g., a base station. The communication device may be mobile, e.g., integrated in a transportation vehicle. For example, the communication device and the other communication device may communicate in/via a mobile communication system. The mobile communication system may comprise a plurality of transmission points and/or base stations operable to communicate radio signals with the communication device. In an example, the mobile communication system may comprise the communication device and the other communication device.

A base station, e.g., the other communication device, can be located in the fixed or stationary part of the network or system. The other communication device may correspond to a remote radio head, a transmission point, an access point, a macro cell, a small cell, a micro cell, a pico cell, a femto cell, a metro cell etc. The term small cell may refer to any cell smaller than a macro cell, i.e., a micro cell, a pico cell, a femto cell, or a metro cell. Moreover, a femto cell is considered smaller than a pico cell, which is considered smaller than a micro cell. The other communication device can be a wireless interface of a wired network, which enables transmission and reception of radio signals to UE, such as the communication device. Such a radio signal may comply with radio signals as, for example, standardized by 3GPP or, generally, in line with one or more of the above listed systems. Thus, the other communication device may correspond to a NodeB, an eNodeB, a BTS, an access point, etc.

The mobile communication system may be cellular. The term cell refers to a coverage area of radio services provided by a transmission point, a remote unit, a remote head, a remote radio head, communication device, UE or a NodeB, an eNodeB, respectively. The terms cell and base station may be used synonymously. A wireless communication device, e.g., the communication device, can be registered or associated with at least one cell (e.g., the other communication device), i.e., it can be associated to a cell such that data can be exchanged between the network and the mobile in the coverage area of the associated cell using a dedicated channel, connection or connection.

In general, the communication device is a device that is capable of communicating wirelessly. In particular, however, the communication device may be a mobile communication device, i.e., a communication device that is suitable for being carried around by a user. For example, the communication device may be a User Terminal (UT) or UE within the meaning of the respective communication standards being used for mobile communication. For example, the communication device may be a mobile phone, such as a smartphone, or another type of mobile communication device, such as a smartwatch, a laptop computer, a tablet computer, or autonomous augmented-reality glasses. For example, the communication device and the other communication device may be configured to communicate in a cellular mobile communication system. Accordingly the communication device and the other communication device may be configured to communicate in a cellular mobile communication system, for example, in a Sub-6 GHz-based cellular mobile communication system (covering frequency bands between 500 MHz and 6 GHz) or in a mmWave-based cellular mobile communication system (covering frequency bands between 20 GHz and 60 GHz). In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the communication device/other communication device may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the communication device and the other communication device may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the communication device and the other communication device may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the communication device and the other communication device may be initiated using the protocols of the mobile communication system, or using a short-range communication system, such as via a wireless local area network outlined above.

As is evident from the above example, while the communication between the communication device and the other communication device occurs via the mobile communication system, additional communication and/or alternatively communication (e.g., the communication device and the other communication device may be each integrated into a different transportation vehicle) between the communication device and the other communication device may occur via a vehicular communication system. Such communication may be carried out directly, e.g., by Device-to-Device (D2D) communication. Such communication may be carried out using the specifications of the vehicular communication system. An example of D2D is direct communication between transportation vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc.

The processing gain information may be utilized by the communication device to adjust a transmission parameter used for radio communication with the other communication device. Thus, the radio communication between the communication device and the other communication device may be improved. For example, the processing gain may be adjusted to achieve a minimal required data rate for using a service, e.g., video streaming and/or a minimal required latency time, e.g., for a Tele-Operated Driving (ToD) session.

Transmitting 110 the request for the processing gain information can be done at least partially in advance. For example, a user of the communication device may intend to start a service with a high required data rate, e.g., by starting a streaming app, video call app etc. Thus, the communication device may transmit 110 the request for the processing gain information based on the user input, e.g., a trigger event such like an invocation of a service requiring high data rate (e.g., starting a streaming app). This way the communication device may have already received the processing gain information necessary to use that service before the user actually starts the service, e.g., begins streaming a video. Thus, if the user starts the service, e.g., by selecting a desired video, a user experience may be improved, since information about parameters for a necessary are already obtained, which may improve a service begin.

Optionally or alternatively, transmitting 110 the request can be done during usage of the service. For example, the actual processing gain of the radio communication may be not good enough to provide a satisfying user experience, e.g., a video stream resolution may be too low. Thus, the communication device can transmit 110 the request to receive the processing gain information and can adjust the processing gain based on the processing gain information, thus the user experience may be improved, e.g., a data rate and thus also a resolution of the video may be increased.

For example, the processing gain information can be used to inform a user of the communication device about a possible usage of each service of the communication device, e.g., about a usage of video streaming, ToD-session, video call, gaming application etc. For example, an achievable processing gain may be sufficient to use a video streaming service but not to use ToD service. Thus, the user can be informed in an improved way that a video streaming service is available, and a ToD service is not available.

The processing gain information can be received 120 by use of an antenna system of the communication device. For example, the information about the environment may be received from the other communication device of the communication system. The other communication device can be e.g., a base station, a transportation vehicle, an infrastructure, a smartphone, etc.

For example, the processing gain may be an indication of a transmission characteristic of the radio communication. Thus, by receiving the processing gain information the communication device can adjust the radio communication to achieve a desired transmission characteristic, e.g., a signal intensity, a signal-to-noise ratio (SNR), a latency time, a data rate, a combination of mentioned parameters etc.

In an example, the processing gain information may comprise information about at least one element of the group of a radio channel parameter, a number of antennas used for communication, an antenna configuration, a usage time of the processing gain information, a predictive quality of signal and a radio access technology. Thus, the communication device can be informed about different parameters belonging to the processing gain of the radio communication. For example, the processing gain may depend on a number of antennas used for communication, e.g., used for beamforming. A smaller beam used for communication with the other communication device may increase a signal intensity. But the smaller beam may also decrease a usage time of the processing gain information. For example, an update rate (to update the processing gain information) may be increased for smaller beams, since a movement of the communication device relative to the other communication device is more critical as for a wider beam. Thus, the processing gain information may comprise information about a usage time of the processing gain information, such that the communication device is enabled to request in advance new processing gain information. For example, a PQoS may be comprised by the processing gain information to enable the communication device to adjust the processing gain corresponding to future events.

In an example, the request may further comprise performance information about at least one element of the group of a desired service type, a desired service priority, a desired route of the communication device and a desired velocity of the communication device. Thus, the other communication device is enabled to determine the processing gain information in an improved way based on the performance information, e.g., for future events, desired service, etc. For example, the user of the communication device may want to use two different services at the same time, e.g., ToD and video streaming. A prioritization of the services can be provided by the user. Since a user experience of video streaming while driving a transportation vehicle may be strongly decreased, the ToD service may be prioritized over the video streaming service. Thus, if e.g., a data rate is not sufficient for both services the user may be informed by the processing gain response message that only the ToD service can be used. Thus, using the performance information the user experience can be improved. Alternatively, the other communication device can provide a prioritization of different services.

For example, a usage of a service may depend on a route of the communication device. By transmitting a desired route the other communication device can provide the communication device information about a usage of the desired route, e.g., using the processing response message. This way the communication device can be informed about a possible use of the desired route or if a service is not available for the desired route about an alternative route. Thus, a user may be improved since he can be informed about different route which may enable different services.

For example, the usage time of the processing gain information may depend on location of the communication device, e.g., on a route of the communication device. For example, if a communication device needs more time to pass a planned route, e.g., due to a traffic jam, the usage time is not limited by a time, because the processing gain information may be valid as long as the transportation vehicle is on the route, regardless of a time.

Optionally or alternatively, the other communication device can use the desired velocity of the communication device to determine a usage time of the processing gain information. Thus, the determination of the processing gain information can be improved.

In an example, the processing gain response message may further comprise data about a confidence level of the processing gain information and/or a movement parameter of the communication device necessary for the service. For example, a confidence level may be related to an accuracy of a PQoS, e.g., a higher confidence level indicates a higher accuracy of the PQoS. This way a desired service may only be used if a minimum confidence level is reached, e.g., for a safety critical service like ToD or a user experience can be improved by e.g., beginning video streaming only if the confidence level indicates a streaming free from interrupts. For example, the processing gain response message can be a framework for transmission parameter required for the use of a desired service.

For example, the movement parameter of the communication device can be a route, which the transportation vehicle has to take to achieve a processing gain required for a desired service and/or a maximum velocity of the communication device. Thus, if the communication device moves slower than the maximum velocity the processing gain required for the desired service can be achieved and thus the communication device may adapt a velocity to a desired service. For example, a user of a transportation vehicle may have the choice between using a service for video streaming at a lower transportation vehicle velocity or driving faster with the transportation vehicle without using the service for video streaming. Optionally or alternatively, the processing gain response message can be a framework for a movement parameter of the communication device required for the use of a desired service.

In an example, the method 100 may further comprise using the processing gain information, data about the confidence level and/or a movement parameter of the communication device necessary for the service to adjust a parameter of an antenna system of the communication device. Thus, the antenna system of the communication device can be adjusted to achieve the processing gain of the radio communication required for the desired service, e.g., by beamforming.

In an example, the request for the processing gain information and/or the processing gain response message may be transmitted by a broadcast message, groupcast message or unicast message. Thus, a transmission can be adjusted in an approved way to a use case. For example, the request for the processing gain information and/or the processing gain response message can be transmitted by a network layer (layer 3 of an Open Systems Interconnection (OSI) model) e.g., by use of a Radio Resource Control (RRC) protocol used between UE and base station. For example, a RRC as used in 5G on an Air interface. This protocol is specified by 3GPP in TS 38.331[3] for 5G New Radio. The use of an RRC layer may be sufficient for services with low latency time requirements, such like video streaming. For example, the communication device may transmit the request for processing gain information corresponding to a video streaming service using an RRC layer.

Optionally or alternatively, the request for the processing gain information and/or the processing gain response message can be transmitted by a data link layer (layer 2 of an OSI model), e.g., a data link layer described in ETSI EN 302 663 V1.3.1 (2020-01) under section 4.3. The use of the data link layer may increase time critical performance, since communication using the data link layer is faster as communication using the network layer. Thus, for a service with higher latency time requirements, e.g., ToD, the use of a data link layer may decrease time needed to perform the method 100 and/or an update rate (to update the processing gain information).

Optionally or alternatively, the request for the processing gain information and/or the processing gain response message can be transmitted by a physical layer (layer 1 of an OSI model), e.g., a physical layer described in ETSI EN 302 663 V1.3.1 (2020-01) under section 4.2. The use of the physical layer may further increase time critical performance, since communication using the physical layer is faster as communication using data link layer. Thus, for a service with higher latency time requirements, e.g., ToD, the use of a data link layer may decrease time needed to perform the method 100 and/or an update rate (to update the processing gain information).

More details are mentioned in connection with the embodiments described above and/or below. The example shown in FIG. 1 may comprise one or more optional additional features corresponding to one or more facets mentioned in connection with the proposed concept or one or more examples described below (e.g., FIG. 2—YYY).

FIG. 2 shows another example of a method 200 for a communication device. The method 200 for a communication device for adjusting a processing gain, comprises transmitting 210 a request for a reduced database, which allows the communication device to determine processing gain information to achieve a processing gain necessary for a service. Further, the method 200 comprises receiving 220 the reduced database and determining 230 the processing gain information based on the received reduced database.

The other communication device may determine the processing gain information by use of a database (as described in more with reference to FIG. 3). Thus, by transmitting a reduced database to the communication device, the communication device can be enabled to determine the processing gain information on its own. This way, the communication device may periodically update the processing gain information even if no communication with the other communication device is possible, increasing a reliability of the processing gain information. For example, the reduced database can be received e.g., by the processing gain response message.

For example, the reduced database may be received from a communication device of the communication system, e.g., from the communication device, a transportation vehicle, an infrastructure, a smartphone, a base station etc. For example, an infrastructure, e.g., a traffic light, may comprise a reduced database adapted to an environment of the infrastructure. Thus, the infrastructure can transmit the reduced database, e.g., by the processing gain response message, to the communication device, which may reduce a traffic load of the other communication device, e.g., a base station. For example, the reduced database can be shared by the other communication device with communication devices in the communication system, such like the traffic light. Thus, the determination of the processing gain information can be decentralized, e.g., performed by each transportation vehicle receiving the reduced database. The reduced database may be updated periodically by the other communication device, e.g., the base station.

More details are mentioned in connection with the embodiments described above and/or below. The example shown in FIG. 2 may comprise one or more optional additional features corresponding to one or more facets mentioned in connection with the proposed concept or one or more examples described above (FIG. 1) and/or below (e.g., FIG. 3-4).

FIG. 3 shows an example of a method 300 for another communication device. The method 300 for another communication device for adjusting a processing gain of a radio communication with a communication device, comprises receiving 310 a request for processing gain information from the communication device, which allows the communication device to achieve a processing gain necessary for a service of the communication device. Further, the method 300 comprises determining 320 the processing gain information and transmitting 330 a processing gain response message comprising the processing gain information to the communication device.

The other communication device may be a counterpart to the communication device named in reference to FIG. 1 and FIG. 2, e.g., a base station as counterpart to a communication device inside a transportation vehicle.

In an example, the request may comprise performance information about at least one element of the group of a desired service type, a desired service priority, a desired route of the communication device and a desired velocity of the communication device and determining the processing gain information is further based on the performance information. Thus, the other communication device may be enabled to determine the processing gain information in an improved way as describe above (e.g., with reference to FIG. 1).

In an example, the processing gain information may be determined by use of a database, comprising information about at least one element of the group of a service type, a service priority, a route of the communication device, a network load, a service QoS requirement, a weather, a coverage map, a road topology and a quality-of-service performance record. For example, the database may comprise information relevant for an environment of the communication device. This way the determination 320 of the processing gain information may be based on the environment, e.g., actual weather data (e.g., received from a base station of the communication system).

For example, the database may comprise information relevant for the desired service, e.g., a prioritization of different services, a QoS requirement of a service etc. This way the determination 320 of the processing gain information may be based on a parameter corresponding to a desired service.

For example, the database may comprise information about a possible movement of the communication device, e.g., a route of the communication device, a velocity of the communication device, etc. This way the determination 320 of the processing gain information can be based on a parameter corresponding to a movement of the communication device. It goes without saying that each combination of the described database information may be used as well.

By using the database the determination 320 of the processing gain information can be improved, since all required information for the determination 320 may be available, e.g., at the moment of receiving the request. Thus, especially the PQoS can be determined in an improved way. This way the PQoS performance for beamformed (vehicular) communication can be improved.

For example, a transportation vehicle may be equipped with a connectivity system (CS) comprising the communication device to deal with V2X communication. This CS may be equipped with an antenna system (AS) with one or more panels, each facing different radiating directions and composed of one or more antenna elements, which may be fed by a digitally controlled analog feeding network.

For example, the other communication device may be a base station comprising a memory with the database. The database may be centralized, e.g., each base station of the communication device may comprise the same centralized database. In contrast the reduced database as described above may be just a part of the centralized database, e.g., solely comprising information relevant for the communication device, e.g., for a planned route of the communication device.

The centralized database may hold data related to the different scenario conditions, based on an application type, an application priority, an intended route (locations/timestamps) of the communication device, a network load, an application QoS requirements (data rate, latency, reliability), a weather, a coverage map, a road topology, other potential conditions that may affect the performance, etc.

For example, the centralized database may hold QoS performance records from previous connections associated with these scenario conditions of those previous connections and/or channel configuration (CS) configuration record associated with a QoS performance record (this record may include a parameter associated to the CS, e.g., a beamwidth, a gain, a beam update rate, an angle of departure, an angle of arrival). For example, the database may comprise information about a previous connection to a previous transportation vehicle, which may have intended to use an identical route as the transportation vehicle. Thus, the determination 320 of the processing gain information can be based on data provided by previous transportation vehicles, e.g., on data determined by the previous transportation vehicle and transmitted to the other communication device. This way the determination 320 of the processing gain information can be improved.

Thus, the other communication device may be capable by use of the centralized database to extrapolate a processing gain information (e.g., a CS configuration suggestions) for a given request for processing gain information, by relating current scenario conditions with previously recorded ones. This processing gain information may include a beamwidth, a gain, a beam update rate, an angle of departure, an angle of arrival, etc.

Further, the other communication device may be capable by use of the centralized database to determine an expected QoS profile with an associated confidence level related to how accurate the prediction is. This suggestion may be indicated in a timestamp or location and/or may be periodically or non-periodically updated along the service execution time.

For example, the transportation vehicle comprising the communication device may aim to initiate a service that makes use of network connectivity at high frequency bands (such as mmWave). Thus, the transportation vehicle may connect to the other communication device, e.g., a base station. Further, the transportation vehicle may transmit a request for processing gain information to the base station. The processing gain information may comprise a PQoS support request during a service execution time. The base station may check its centralized database to match current conditions to an estimation of QoS and the associated CS configuration. The information determined may be transmitted by use of a processing gain response message to the transportation vehicle, e.g., the information may be a CS configuration suggestion with beam-based configurations, the expected PQoS profile and its confidence level. The transportation vehicle may then adapt the CS configuration based on the processing gain response message. Further, the transportation vehicle may modulate service requirements (data rate, latency, reliability) according to the processing gain response message. If the service exceeds the time or location that are included in the request for processing gain information the transportation vehicle may transmit a new request for processing gain information.

In an example, the method 300 may further comprise editing the database with the determined processing gain information and/or with corresponding performance information received from the communication device. Thus, as described above the other communication device can maintain, extend and/or improve the database using data received from previous communication devices for future communication devices. This may improve a determination 320 of the processing gain information.

In an example, the method 300 may further comprise receiving a request for a reduced database from the communication device and transmitting at least a part of the database to the communication device. Thus, the communication device can be enabled to determine the processing gain information on its own. For example, the other communication device may transmit a reduced database, which is adapted to a position of the communication device (comparable to the method as described with reference to FIG. 2 and an infrastructure). This may reduce data traffic.

More details are mentioned in connection with the embodiments described above and/or below. The example shown in FIG. 3 may comprise one or more optional additional features corresponding to one or more facets mentioned in connection with the proposed concept or one or more examples described above (FIG. 1-2) and/or below (e.g., FIG. 4).

FIG. 4 shows a block diagram of an apparatus 30. The apparatus 30 comprises one or more interfaces 32 configured to communicate with a communication device or user equipment. The apparatus 30 further comprises processing circuitry 34 configured to control the one or more interfaces and to perform the method a communication device as described above (e.g., described with reference to FIGS. 1-3). For example, the apparatus 30 can be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of vehicle, such as a train, a subway train, a boat or a ship. For example, the proposed concept may be applied to public transportation (trains, bus) and future methods or mechanisms of mobility (e.g., robo-taxis).

For example, the apparatus 30 can be the communication device, where the interface is configured to communicate with the other communication device. Alternatively, the apparatus 30 can be the other communication device, where the interface 32 is configured to communicate with the communication device.

As shown in FIG. 4 the respective one or more interfaces 32 are coupled to the respective processing circuitry 34 at the apparatus 30. In examples the processing circuitry 34 may be implemented using one or more processing units, one or more processing devices, any method or mechanism for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34.

In an exemplary embodiment, the apparatus 30 may comprise a memory and at least one processing circuitry 34 operably coupled to the memory and configured to perform the below mentioned method.

In examples the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details are mentioned in connection with the embodiments described above. The example shown in FIG. 4 may comprise one or more optional additional features corresponding to one or more facets mentioned in connection with the proposed concept or one or more examples described above (FIG. 1-3).

The features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may, for example, be communicated using signaling radio bearers, e.g., by Radio Resource Control (RRC) messages, which are, for example, specified in the *0.331 series of 3GPP as layer 3 control plane messages. For example, physical layer specification, e.g., by Doppler Delay Resolutions and other physical layer specifications may also be affected by disclosed embodiments, e.g., *0.201, *0.211, *0.212, *0.213, *0.214, *0.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several functions to a certain order. Furthermore, in further examples, a single function, process or operation may include and/or be broken up into several sub-functions, -processes or -operations.

If some embodiments have been described in relation to a device or system, these disclosed embodiments should also be understood as a description of the corresponding method. For example, a block, device or functional facet of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

If some embodiments have been described in relation to a device or system, these disclosed embodiments should also be understood as a description of the corresponding method and vice versa. For example, a block, device or functional facet of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

LIST OF REFERENCE SIGNS

30 apparatus
32 interface
34 processing circuitry
100 method for a communication device
110 transmitting a request for processing gain information
120 receiving a processing gain response message
200 method for a communication device
210 transmitting a request for a reduced database
220 receiving the reduced database
230 determining the processing gain information
300 for another communication device
310 receiving a request for processing gain information
320 determining the processing gain information
330 transmitting a processing gain response message

What is claimed is:

1. An apparatus for a communication device, the apparatus comprising:
   one or more interfaces configured to communicate with another communication device; and
   processing circuitry configured to control the one or more interfaces to adjust a processing gain of a radio communication with the other communication device, wherein the adjustment includes:

transmitting a request for processing gain information to the other communication device, which processing gain information indicates a processing gain necessary to enable a service of the radio communication to the communication device;

receiving a processing gain response message that includes both the required processing gain information from the other communication device and data indicating a movement parameter that indicates required movement constraints for the communication device to enable the radio communication service to the communication device; and altering the movement parameter of the communication device to adjust the processing gain required for the service based on the received processing gain response message.

2. The apparatus of claim 1, wherein the processing gain information comprises information about at least one element of the group of:

a radio channel parameter;

a number of antennas used for communication;

an antenna configuration;

a usage time of the processing gain information;

a predictive quality of signal; and a radio access technology.

3. The apparatus of claim 1, wherein the request further comprises performance information about at least one element of the group of:

a desired service category;

a desired service priority;

a desired route of the communication device; and a desired velocity of the communication device.

4. The apparatus of claim 1, wherein the processing gain response message further includes data indicating a confidence level of the processing gain information.

5. The apparatus of claim 4, wherein the processing gain information, data about the confidence level and/or the movement parameter of the communication device necessary for the radio communication service is/are used to adjust a parameter of an antenna system of the communication device.

6. The apparatus of claim 1, wherein the request for the processing gain information and/or the processing gain response message is/are transmitted by a broadcast message, groupcast message or unicast message.

7. A method for a communication device for adjusting a processing gain of a radio communication with another communication device, the method comprising:

transmitting a request for processing gain information to the other communication device, which processing gain information indicates a processing gain necessary to enable a service of the radio communication to the communication device;

receiving a processing gain response message that includes both the required processing gain information from the other communication device and data indicating a movement parameter that indicates required movement constraints for the communication device to enable the radio communication service to the communication device; and altering the movement parameter of the communication device to adjust the processing gain required for the service based on the received processing gain response message.

8. The method of claim 7, wherein the processing gain information comprises information about at least one element of the group of:

a radio channel parameter;

a number of antennas used for communication;

an antenna configuration;

a usage time of the processing gain information;

a predictive quality of signal; and a radio access technology.

9. The method of claim 7, wherein the request further comprises performance information about at least one element of the group of:

a desired service category;

a desired service priority;

a desired route of the communication device; and a desired velocity of the communication device.

10. The method of claim 7, wherein the processing gain response message further includes data indicating a confidence level of the processing gain information.

11. The method of claim 10, further comprising using the processing gain information, data about the confidence level and/or the movement parameter of the communication device necessary for the radio communication service to adjust a parameter of an antenna system of the communication device.

12. The method of claim 7, wherein the request for the processing gain information and/or the processing gain response message is/are transmitted by a broadcast message, groupcast message or unicast message.

13. A non-transitory computer readable medium including a computer program having a program code for performing the method of claim 7, when the computer program is executed on a computer, a processor, or a programmable hardware component.

14. A method for adjusting a processing gain of a radio communication with a communication device, the method comprising:

receiving a request for processing gain information, by another communication device, from the communication device, the processing gain information a processing gain necessary to enable a service of the radio communication to the communication device;

determining the processing gain information and data about a movement parameter of the communication device necessary for the service; and transmitting a processing gain response message to the communication device, the processing gain response message including both the determined required processing gain information and the data indicating a movement parameter that indicates required movement constraints for the communication device to enable the radio communication service to the communication device, wherein the data indicating the movement parameter is used to alter the processing gain required for the service based on the received processing gain response message.

15. The method of claim 14, wherein the request comprises performance information about at least one element of the group of:

a desired service category;

a desired service priority;

a desired route of the communication device; and a desired velocity of the communication device, wherein determining the processing gain information is further based on the performance information.

16. The method of claim 15, wherein the processing gain information is determined by use of a database, and the processing gain information comprises information about at least one element of the group of:

a service category;

a service priority;

a route of the communication device;

a network load;

a service QoS requirement;

a weather;

a coverage map;

a road topology; and a quality-of-service performance record.

17. The method of claim 16, further comprising editing the database to include the determined processing gain information and/or corresponding performance information received from the communication device.

18. The method of claim 14, further comprising:

receiving a request for a reduced database from the communication device; and transmitting at least a part of the database to the communication device.

19. A transportation vehicle comprising the apparatus of claim 1.

20. An apparatus for a communication device, the apparatus comprising:

one or more interfaces configured to communicate with other communication devices or user equipment; and processing circuitry configured to control the one or more interfaces to adjust a processing gain of a radio communication with the other communication devices or equipment, wherein the adjustment includes:

receiving a request for processing gain information allowing the communication device to achieve a processing gain necessary for a service of the communication device;

determining the processing gain information and data about a movement parameter of the communication device necessary for the service; and transmitting a processing gain response message comprising the determined processing gain information and the data about the movement parameter of the communication device necessary for the service;

receiving a request for processing gain information, by another communication device, from the communication device, the processing gain information indicating a processing gain necessary to enable a service of the radio communication to the communication device;

determining the processing gain information and data about a movement parameter of the communication device necessary for the service;

transmitting a processing gain response message to the communication device, the processing gain response message including both the determined required processing gain information and the data indicating a movement parameter that indicates required movement constraints for the communication device to enable the radio communication service to the communication device; and altering the movement parameter of the communication device to adjust the processing gain required for the service based on the received processing gain response message.

21. A transportation vehicle comprising the apparatus of claim 20.

\*   \*   \*   \*   \*